(12) United States Patent
Zhu et al.

(10) Patent No.: US 11,050,799 B2
(45) Date of Patent: Jun. 29, 2021

(54) METHODS AND DEVICES FOR REGISTERING A USER EQUIPMENT, UE, WITH LOW ACCESS PRIORITY IN AN INTERNET PROTOCOL BASED MULTIMEDIA SUBSYSTEM, IMS

(71) Applicant: Telefonaktiebolaget LM Ericsson (publ), Stockholm (SE)

(72) Inventors: Jinyin Zhu, Shanghai (CN); Afshin Abtin, Sollentuna (SE); Ralf Keller, Würselen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 275 days.

(21) Appl. No.: 16/083,950

(22) PCT Filed: Nov. 21, 2017

(86) PCT No.: PCT/CN2017/112141
§ 371 (c)(1),
(2) Date: Sep. 11, 2018

(87) PCT Pub. No.: WO2019/033602
PCT Pub. Date: Feb. 21, 2019

(65) Prior Publication Data
US 2020/0351313 A1    Nov. 5, 2020

Related U.S. Application Data

(60) Provisional application No. 62/545,204, filed on Aug. 14, 2017.

(51) Int. Cl.
*H04W 4/00* (2018.01)
*H04L 29/06* (2006.01)
(Continued)

(52) U.S. Cl.
CPC ...... *H04L 65/1073* (2013.01); *H04L 65/1006* (2013.01); *H04L 65/1016* (2013.01);
(Continued)

(58) Field of Classification Search
CPC ..... H04W 76/10; H04W 48/06; H04W 60/04; H04L 65/1006; H04L 65/1016; H04L 65/1069
See application file for complete search history.

(56) References Cited

U.S. PATENT DOCUMENTS

2008/0014956 A1* 1/2008 Balasubramanian ....................... H04L 41/0806
455/452.1
2009/0215454 A1 8/2009 Przybysz et al.
(Continued)

FOREIGN PATENT DOCUMENTS

| CN | 104243422 A | 12/2014 |
|---|---|---|
| CN | 105871870 A | 8/2016 |

(Continued)

OTHER PUBLICATIONS

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 14)", Technical Specification, 3GPP TS 23.401 V14.3.0, Mar. 1, 2017, pp. 1-386, 3GPP, France.
(Continued)

*Primary Examiner* — Minh Trang T Nguyen
(74) *Attorney, Agent, or Firm* — Coats & Bennett, PLLC

(57) ABSTRACT

A method for registering a User Equipment, UE, with low access priority in an Internet Protocol based Multimedia Subsystem, IMS, network said method comprising the steps of receiving, by a Proxy-Call Serving Control Function,
(Continued)

P-CSCF node comprised by said IMS network, a Session Initiation Protocol, SIP, Register message for registering said UE in said IMS network, determining, by said P-CSCF node, that said SIP Register message comprises an indication that said UE is using a low access priority, wherein said low access priority indicates at least a reduced priority for said UE for accessing network resources, and establishing, by said P-CSCF node, said registration of said UE with said determined low access priority indication. Complementary methods and devices for performing a method according to the invention are also presented herein.

16 Claims, 7 Drawing Sheets

(51) Int. Cl.
    *H04W 76/10*        (2018.01)
    *H04W 48/06*        (2009.01)
    *H04W 60/04*        (2009.01)

(52) U.S. Cl.
    CPC ......... *H04L 65/1069* (2013.01); *H04W 48/06* (2013.01); *H04W 60/04* (2013.01); *H04W 76/10* (2018.02)

(56) References Cited

U.S. PATENT DOCUMENTS

| | | | | |
|---|---|---|---|---|
| 2013/0060954 | A1* | 3/2013 | Dahlqvist | H04L 65/1069 709/228 |
| 2013/0182607 | A1 | 7/2013 | Kim et al. | |
| 2013/0279406 | A1 | 10/2013 | Merino Vazquez et al. | |
| 2013/0304956 | A1* | 11/2013 | Barclay | H04W 74/006 710/220 |
| 2015/0078208 | A1* | 3/2015 | Bakker | H04L 63/0407 370/259 |
| 2017/0019750 | A1* | 1/2017 | Palanisamy | H04W 4/70 |
| 2018/0146503 | A1* | 5/2018 | Castro Castro | H04W 76/18 |

FOREIGN PATENT DOCUMENTS

| | | |
|---|---|---|
| CN | 106911626 A | 6/2017 |
| WO | 2013169615 A1 | 11/2013 |

OTHER PUBLICATIONS

3rd Generation Partnership Project, "3rd Generation Partnership Project; Technical Specification Group Services and System Aspects; IP Multimedia Subsystem (IMS); Stage 2 (Release 14)", Technical Specification, 3GPP TS 23.228 V14.3.0, Mar. 1, 2017, pp. 1-321, 3GPP, France.

3rd Generation Partnership Project, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15)", Technical Specification, 3GPP TS 29.274 v15.0.0, Jun. 1, 2017, pp. 1-369, 3GPP, France.

3rd Generation Partnership Project, "3rd Generation Partnership Project; Technical Specification Group Services and System Aspects; Telecommunication management; Charging management; Packet Switched (PS) domain charging (Release 14)", Technical Specification, 3GPP TS 32.251 V14.3.0, Jun. 1, 2017, pp. 1-186, 3GPP, France.

The GSM Association, "IMS Profile for Voice and SMS for UE category M1", Official Document NG.108, Version 1.0, Jun. 28, 2017, pp. 1-13, GSMA.

3rd Generation Partnership Project; Technical Specification Group Core Network and Terminals; Policy and Charging Control over Rx reference point; 3GPP TS 29.214 V.15.0.0 (Jun. 2017) (Release 15). ACS, OEC, AT&T, T-Mobile USA, Cx/Dx Support for Priority Treatment, 3GPP TSG CT4 Meeting #70, Vancouver, Canada, Aug. 17-21, 2015, C4-151281 Was C4-151257.

\* cited by examiner

METHODS AND DEVICES FOR REGISTERING A USER EQUIPMENT, UE, WITH LOW ACCESS PRIORITY IN AN INTERNET PROTOCOL BASED MULTIMEDIA SUBSYSTEM, IMS

TECHNICAL FIELD

The present disclosure is generally related to the registering of a User Equipment, UE in an Internet Protocol based Multimedia Subsystem, IMS, and more specifically, to registering a UE with low access priority in the IMS.

BACKGROUND

The Third Generation Partnership Project, 3GPP, is responsible for developing new standards in telecommunication. It is foreseen that with the increase in the number of "smart" devices, the communication network of the future should be able to support more devices. Such a communication network wherein several devices communicate with one another is also often referred to as Internet of Things, IoT.

The 3GPP published Release 13 of the Long Term Evolution, LTE, standard, defining new narrowband categories of LTE for IoT: category M1, formerly known as Enhancements in Machine Type Communications, eMTC, and category NB1, formerly known as Narrow Band IoT, NB-IoT. These new categories extend the market reach of LTE, enabling it to cost-effectively support lower data rate applications, including the extremely low power, sensing or monitoring devices envisioned to be everywhere in the IoT. The availability of these new LTE for IoT technologies immediately creates opportunities for IoT device makers, but the two technologies differ from each other in throughput, mobility, power, latency, and cost.

Cat M1 supports Voice over LTE, VoLTE, while Cat NB1 does not. Certain IoT applications benefit from the VoLTE capability, including alarm panels and personal safety devices, indicating that Cat M1 is required. Furthermore, Cat M1 enables LTE module cost to equal today's 2G module cost.

The massive IoT will connect billions of objects with devices of every possible configuration and capability. The new LTE for IoT categories, M1 and NB1, along with the existing Cat 1 and higher technologies already deployed, ensure that there is an all-encompassing and cost effective LTE platform for any deployment scenario.

A User Equipment, UE, accessing a communication network through Cat M1 usually is configured for a low priority access. The low priority access is indicated to the core network so that the core network is aware of the type of the device and the nature of the access being used to access the core network. Based on the received low priority access indicator, the core network is able to offer a lower bandwidth or apply a different pricing scheme for devices using such a low priority access.

A UE configured for low access priority shall transmit the low access priority indicator to the Mobility Management Entity, MME, during the appropriate Non-Access Stratum, NAS, signalling procedures and transmit the corresponding low access priority to the Evolved Universal Terrestrial Radio Access Network, E-UTRAN, during Radio Resource Control, RRC, connection establishment procedures.

If the NAS session management request message used to establish a new PDN connection contains a low access priority indication, the MME shall forward the low access priority indication in the create session request message to the Session Gateway, S-GW, or the Packet Gateway, P-GW. The low priority indication gets associated with a Packet Data Network, PDN, connection when it is established and it shall not change until the PDN connection is deactivated.

According to Technical Specification, TS, 23.401, the eNodeB can determine whether or not the UE is configured for low access priority from information received in the RRC establishment or RRC resume signalling. The eNodeB may be configured to select MMEs from a specific Core Network, CN, for UEs configured for low access priority only for the case that no other information and configuration is available for selecting an MME from a specific CN.

The eNodeB may use the low access priority indication provided by the UE to steer UEs configured for low access priority to specific MMEs. A UE configured for low access priority shall transmit the low access priority indicator to the MME during the appropriate NAS signalling procedures and transmit the corresponding low access priority to the E-UTRAN during RRC connection establishment procedures.

The low access priority indication may be included in charging records by the visited and home network. In order to permit the S-GW to include the low access priority indicator in the charging records, the low access priority indicator should be stored in the MME EPS bearer contexts and should be passed as part of these contexts to other SGSN/MME or S-GW nodes in mobility management procedures.

In this release there is no other usage of storing the low access priority indicator in the EPS bearer contexts other than for the purpose to include it in charging records. Particularly, the low access priority indicator in EPS bearer contexts is not used by the network to make overhead control decisions.

In TS 23.401, it cannot be guaranteed that voice services will be available for mobile terminated calls when the mobility management back-off timer is running. It is recommended that UEs requiring voice services are not configured for low access priority. From this, it may be understood that the low access priority for UEs is not desirable, and even if available, voice services may not be available to such UEs.

For mobile originated services, UEs configured for low access priority provide the E-UTRAN with information indicating that the RRC connection establishment request has low access priority. For mobile originated services, UEs configured for low access priority provide a low access priority indication to the MME in NAS signalling that permit the MME to undertake protective measures.

The packet core, EPC, can distinguish between the type of device and the access being used by the device, but the IMS cannot. It is essential to differentiate between VoLTE and Cat M1 LTE in order to:

Keep track of dropped calls or to maintain other statistical information

Charging low priority access separately.

The packet core gets information from the RAN and maintains this information in the P-GW. The present patent application is more directed towards what you actually do with this information.

If the UE is configured for NAS signalling low priority, i.e., it supports the low access priority indication, then EPC is informed about low access priority and can include the information in charging records. However the IMS is unaware if an IMS service is provided to the UE over low access priority and hence it:

Cannot use this information for own purpose (prioritization, CDRs, counter)

Cannot use it for NNI selection and

Cannot provide an indication over NNI

In the present state of the art, there is a need to identify the type of access, and register a UE accessing the IMS with a low access priority in the IMS.

SUMMARY

It is an object to provide methods for registering a User Equipment, UE, with low access priority in an Internet Protocol based Multimedia Subsystem, IMS.

It is another object to provide for devices for registering a UE with low access priority in an IMS.

In a first aspect, there is provided a method for registering a User Equipment, UE, with low access priority in an Internet Protocol based Multimedia Subsystem, IMS, network.

The method comprises the steps of receiving, by a Proxy-Call Serving Control Function, P-CSCF node comprised by said IMS network, a Session Initiation Protocol, SIP, Register message for registering said UE in said IMS network, determining, by said P-CSCF node, that said SIP Register message comprises an indication that said UE is using a low access priority, wherein said low access priority indicates at least a reduced priority for said UE for accessing network resources, and establishing, by said P-CSCF node, said registration of said UE with said determined low access priority indication.

It was an insight of the inventors that it may be advantageous to transmit the low access priority to a P-CSCF node located in the IMS network so that the IMS network is made aware that the UE is accessing services within the IMS network using a low access priority. The low priority access indicator may be transmitted to the P-CSCF node in a SIP register message.

One of the advantageous of the present disclosure is that the core network of the telecommunication network does not need to be amended. It is the UE itself that may add the indication that the UE is using low access priority in the SIP register message to increase the awareness of the IMS network.

The P-CSCF node may then continue with the establishment of the registration of the UE with the low access priority within the IMS network. That is, the P-CSCF may forward corresponding message between, for example, the Subscriber CSCF and the UE itself.

It is noted that a P-CSCF node is a well-defined node in typical IMS networks. More specifically, the P-CSCF is considered to be the entry point in the IMS domain and may serve as an outbound proxy server for UE's within the IMS domain. The UE may attach to the P-CSCF prior to performing IMS registration and initiating SIP sessions.

Another advantage is directed to the concept that the indication that the UE is using low access priority is comprised in a SIP register message. The SIP register message is sent, by the UE, to register to the IMS network. The IMS network is immediately made aware of the low access priority, by introducing that particular indication into the first message exchanged with the IMS network, i.e. the SIP register message.

Following the above, the UE may already be registered in a core network of the telecommunication network. Before sending out the SIP register message, a Public Data Network, PDN, connection establishment may be initiated with the PGW present in the core network. Such a PDN connection may use a low access priority indication. That particular PDN connection is then used for conveying the SIP register message, i.e. the PDN connection is used for the connection to an external network like the IMS network.

Following the above, the core network, for example the Mobility Management Entity, MME, and/or the Packet Gateway node, PGW, may already be aware that the UE is using low access priority, as that follows from the PDN connection establishment.

It is noted that the underlying concept of the present disclosure is mainly discussed in reference to an Evolved Packet Core, EPC, network corresponding to 4G technology. The present concept may, however, be applicable for any type of core network, for example based on 5G technology, that is arranged to provide connectivity to the IMS network.

According to an example of a method according to the present disclosure, the UE is registered in a telecommunication network, and wherein said telecommunication network comprises a Policy and Charging Rules Function, PCRF, node, which PCRF node is aware that said UE is using said low access priority within said telecommunication network, and wherein said step of determining comprises:

requesting, by said P-CSCF node, said PCRF node whether said UE is using said low access priority;

receiving, by said P-CSCF node, from said PCRF node an acknowledgement that said UE is using said low access priority.

The PCRF node may be part of the Evolved Packet Core, PEC, that supports service data flow detection, policy enforcement and flow-based charging. Following the above, it is noted that the PCRF node may be aware of the concept that the UE has an established PDN connection with the PGW using a low access priority. As such, the PCRF node is aware that, at least for the core network part, the UE is using low access priority.

The P-CSCF node may receive the request from the UE that it intends to use low access priority also for the IMS domain. The P-CSCF node may perform a check to determine whether the UE is trustworthy. That is, the P-CSCF node may request the PCRF node whether the UE is using low access priority in the core network, and, if confirmed by the PCRF node, it may accept the request received from the UE and continue with the registration establishment of the UE in the IMS domain.

According to an example, the method further comprises the step of:

using, by said IMS network, said determined low access priority for said UE for any of Prioritization, Charging Data record's, CDRs, Counters and Network-to-Network Interface, NNI, selection.

Once the IMS network, for example the P-CSCF, the S-CSCF or any application server, AS, is aware of the fact that the UE uses a low access priority, it may use that information for different kinds of purposes.

In an example of the method, the step of establishing comprises:

forwarding, by said P-CSCF node, said SIP Register message to any of an Interrogating Call State Control Function, I-CSCF, node or a Serving Call State Control Function, S-CSCF, node comprised by said IMS network.

In a second aspect of the present disclosure, there is provided a method for enabling registration of a User Equipment, UE, with low access priority in an Internet Protocol based Multimedia Subsystem, IMS, network, wherein said UE is arranged to be connected to a telecommunication network, said telecommunication network comprising a Policy and Charging Rules Function, PCRF, node.

The method comprises the steps of receiving, by said PCRF node, from a Packet Gateway, PGW, node, triggered by a Public Data Network, PDN, connectivity request for requesting a PDN connection for said UE, an indication that said UE is using low access priority, wherein said low access priority indicates at least a reduced priority for said UE for accessing network resources.

The method further comprises the steps of informing, by said PCRF node, a Proxy-Call Serving Control Function, P-CSCF node comprised by said IMS network, that said UE is using said low access priority for enabling said P-CSCF node to register said UE in said IMS network using said low access priority.

In accordance with the present invention, different aspects applicable to the above mentioned examples of the method, including the advantages thereof, correspond to the aspects which are applicable to the PCRF node according to the present disclosure.

In an example, the step of informing is actively triggered by said received indication that said UE is using low access priority.

The above example is directed to a sort of subscription mode. That is, the P-CSCF node may indicate to the PCRF that it would like to be updated whenever a UE, or some particular UE's, start using a low access priority. As such, the PCRF may, actively, inform the P-CSCF whenever such an event has occurred.

According to an example of the second aspect of the disclosure, the step of informing comprises receiving, by said PCRF node, from said P-CSCF node, a request whether said UE is using said low access priority, and transmitting, by said PCRF node, to said P-CSCF node, an acknowledgement that said UE is using said low access priority.

As mentioned above, this present example is directed to a check whether the UE is actually using the low access priority in the core network of the telecommunication network. This, thus, improves the security aspects of the network. That is, the UE can, for example, not claim to use low access priority in the core network while it is actually not doing that as that particular aspect is checked with the PCRF node, by the P-CSCF node.

In a third aspect of the present disclosure, there is provided a method for registering a User Equipment, UE, with low access priority in an Internet Protocol based Multimedia Subsystem, IMS, network. A step of the method involves transmitting, by said UE, to an access node comprises by a telecommunication network, a Public Data Network, PDN, a connectivity request for requesting a PDN connection for obtaining access to said IMS network, wherein said PDN connectivity request comprises an indication that said UE is using low access priority, wherein said low access priority indicates at least a reduced priority for said UE for accessing network resources.

In a further step, the UE receives, from said access node, confirmation that said PDN connection is established. In a further step, the UE transmits over said established PDN connection, towards said IMS network, a Session Initiation Protocol, SIP, Register message for registering said UE in said IMS network, wherein said SIP Register message comprises said indication that said UE is using low access priority.

In a further step, the UE receives from said access node, an SIP acknowledgement message indicating that said UE is registered in said IMS network using low access priority.

In accordance with the present invention, different aspects applicable to the above mentioned examples of the methods, including the advantages thereof, correspond to the aspects which are applicable to the UE according to the present disclosure.

It is noted that the present aspect discloses the concept that the UE first initiates a PDN bearer, i.e. PDN connection, towards the PGW for accessing the IMS network. This particular PDN connection is established using a low access priority.

Next, the UE intends to register to the IMS network using a SIP register message which is sent from the UE to the IMS network over the PDN connection. The IMS network itself may not be aware that the UE is using a low access priority, i.e. that the PDN connection from the UE to the PGW corresponds to a low access priority indication. As such, the UE may incorporate that particular indication in the SIP register message to also make the IMS network aware of that particular fact.

In a fourth aspect of the present disclosure, there is provide a Proxy-Call Serving Control Function, P-CSCF node arranged for supporting registration of a User Equipment, UE, with low access priority in an Internet Protocol based Multimedia Subsystem, IMS, network.

The P-CSCF node comprises receive equipment arranged for receiving a Session Initiation Protocol, SIP, Register message for registering said UE in said IMS network, process equipment arranged for determining that said SIP Register message comprises an indication that said UE is using a low access priority, wherein said low access priority indicates at least a reduced priority for said UE for accessing network resources, and establish equipment arranged for establishing said registration of said UE with said determined low access priority indication.

According to an embodiment of the fourth aspect of the present disclosure, being the P-CSCF node, the UE is registered in a telecommunication network, and wherein said UE is registered in a Policy and Charging Rules Function, PCRF, node in said telecommunication network that said UE is using said low access priority within said telecommunication network. The process equipment is further arranged for requesting said PCRF node whether said UE is using said low access priority, and for receiving from said PCRF node an acknowledgement that said UE is using said low access priority.

In an embodiment of the fourth aspect of the present disclosure, being the P-CSCF node, the process equipment is further arranged for using said determined low access priority for said UE for transmitting to a subsequent node in said IMS for any of Prioritization, Charging Data record's, CDRs, Counters and Network-to-Network Interface, NNI, selection.

An embodiment according to the fourth aspect of the present disclosure, being the P-CSCF node, the P-CSCF node further comprises transmit equipment arranged for forwarding said SIP Register message to an Interrogating Call State Control Function, I-CSCF, node comprised by said IMS network.

In a fifth aspect of the present disclosure, there is provided a Policy and Charging Rules Function, PCRF, node arranged for operating in telecommunication network and arranged for enabling registration of a User Equipment, UE, with low access priority in an Internet Protocol based Multimedia Subsystem, IMS, network, wherein said UE is arranged to be connected to a telecommunication network.

The PCRF node comprises receive equipment arranged for receiving, from a Packet Gateway, PGW, node, triggered by a Public Data Network, PDN, a connectivity request for requesting a PDN connection for said UE, an indication that said UE is using low access priority, wherein said low access priority indicates at least a reduced priority for said UE for accessing network resources.

The PCRF node further comprises inform equipment arranged for informing a Proxy-Call Serving Control Function, P-CSCF node comprised by said IMS network, that said UE is using said low access priority for enabling said P-CSCF node to register said UE in said IMS network using said low access priority.

In an embodiment according to the fifth aspect of the present disclosure, being the PCRF node, the inform equipment is further arranged to be actively triggered by said received indication that said UE is using low access priority.

In an embodiment according to the fifth aspect of the present disclosure, being the PCRF node, the inform equipment is further arranged for receiving from said P-CSCF node, a request whether said UE is using said low access priority, and transmitting to said P-CSCF node, an acknowledgement that said UE is using said low access priority.

In a sixth aspect of the present disclosure, there is provided a User Equipment, UE, arranged for requesting registration in an Internet Protocol based Multimedia Subsystem, IMS, network, with low access priority.

The UE comprises transmit equipment arranged for transmitting to an access node comprises by a telecommunication network, a Public Data Network, PDN, connectivity request for requesting a PDN connection for obtaining access to said IMS network, wherein said PDN connectivity request comprises an indication that said UE is using low access priority, wherein said low access priority indicates at least a reduced priority for said UE for accessing network resources.

The UE further comprises receive equipment arranged for receiving, from said access node, confirmation that said PDN connection is established, wherein said transmit equipment is further arranged for transmitting, by said UE, over said established PDN connection, towards said IMS network, a Session Initiation Protocol, SIP, Register message for registering said UE in said IMS network, wherein said SIP Register message comprises said indication that said UE is using low access priority.

The receive equipment is further arranged for receiving, from said access node, an SIP acknowledgement message indicating that said UE is registered in said IMS network using low access priority.

In a seventh aspect of the present disclosure, there is presented a computer program product, comprising a readable storage medium, comprising instructions which, when executed on at least one processor, cause the at least one processor to carry out the method according to any of the method claims as provided above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
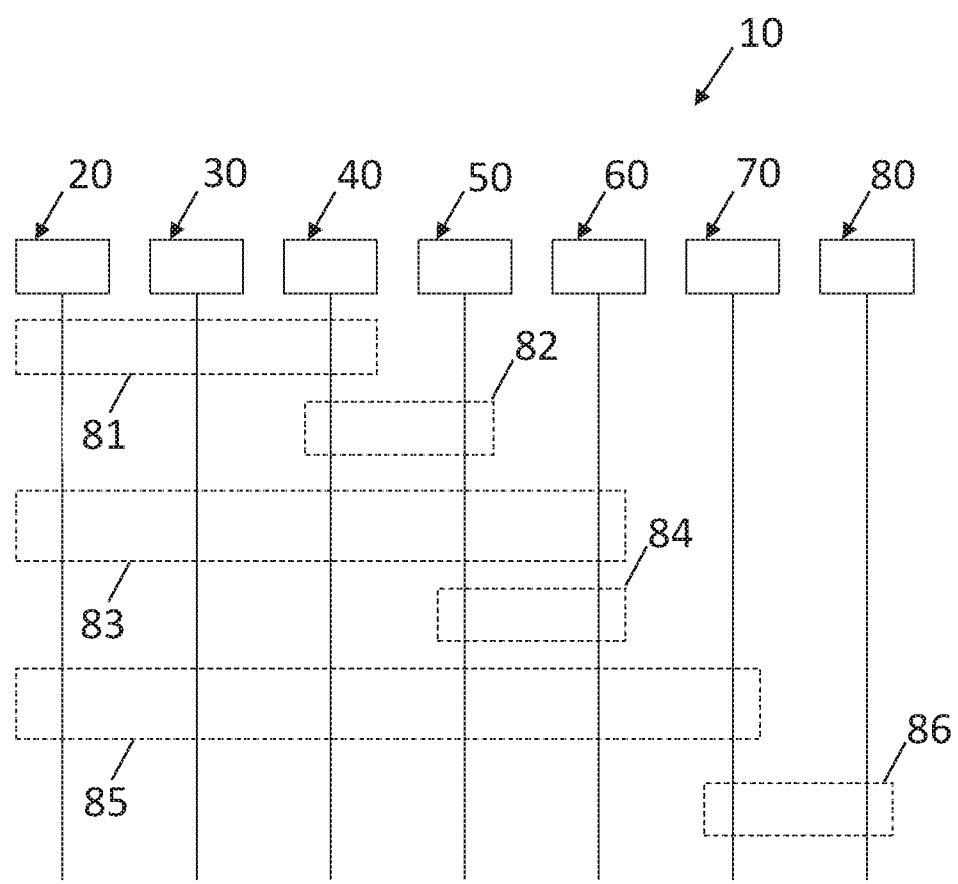
FIG. 1 schematically shows a method of registering a User Equipment, UE, with low access priority in an Internet Protocol bases Multimedia Subsystem, IMS.

FIG. 1 schematically shows a method 10 of registering a User Equipment, UE, with low access priority in an Internet Protocol bases Multimedia Subsystem, IMS. In step 81, an Internet Protocol based Multimedia Subsystem, IMS, Public Data Network, PDN, connection is established between the User Equipment, UE, 20 and the Packet Gateway, P-GW, 40. This step 81 of establishing may also traverse the Mobility Management Entity, MME, node 30. During the establishment 81 of the IMS PDN connection, a low access priority indication is also included by the UE indicating that the UE is arranged for, and is using the low access priority. The P-GW 40 proceeds to inform the Policy and Charging Rules Function, PCRF, node 50 that the UE 20 is accessing services with a low access priority.

In a further step 83, the UE 20 requests registration in the IMS indicating the low access priority. The registration request may be handled by the Proxy-Call Session Control Function, P-CSCF, node 60. In order to improve the reliability of the system, the P-CSCF 60 checks 84 with the PCRF 50 to see whether or not the UE 20 is indeed authorized to use the low access priority. In a further step 85, the P-CSCF 60 proceeds with the registration of the UE 20 in the IMS with or without the low access priority depending on the confirmation received from the PCRF 50 in the step 84. In a final step 86, the UE 20 is registered in the IMS, and more specifically, the details of the UE 20 are available at the IMS-Application Server, IMS-AS, 80.

Figure 2:
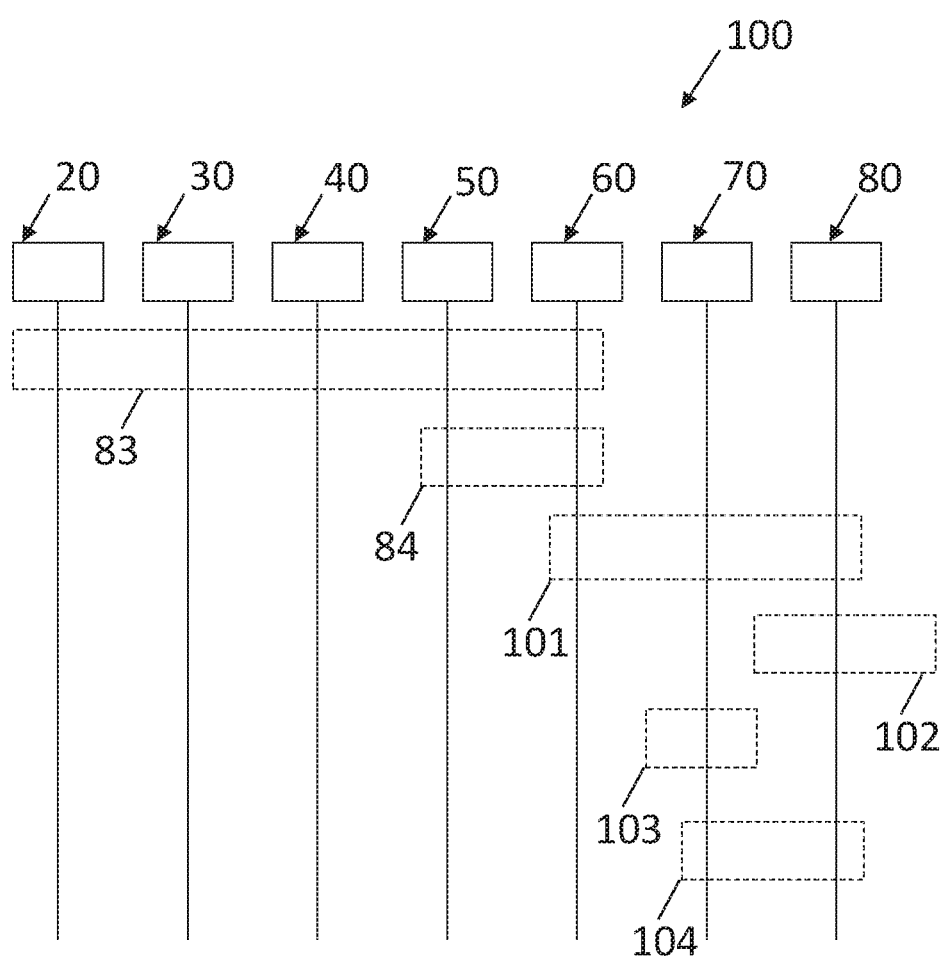
FIG. 2 schematically shows a method of registering a UE with low access priority in an IMS.

FIG. 2 schematically shows a method 100 of registering a UE with low access priority in an IMS. As illustrated, the method performs all steps up to step 83, as explained previously, wherein the P-CSCF 60 checks with the PCRF 50 to see whether or not the UE 20 is authorized to use the low access priority in the IMS network. The P-CSCF 60, in step 101, continues the IMS session upon receiving indication from the PCRF 50 that the UE 20 is indeed authorized to use the low priority access. The IMS-AS 80, in step 102, determines whether to include the low priority indication to a third party.

Such a third party may be, for example, an external communication network where the UE was not originally registered. Such a decision may be based on the local policy or by taking into account the relevant subscriber information. If the IMS-AS 80 decides that the low priority indicator is to be included in the communication to a third party, the Session-Control Session Call Function, S-CSCF 70 selects 103 a suitable Network-Network Interface, NNI. Subsequently, the IMS session continues 104 with the selected NNI and the indicated low access priority.

Figure 3:
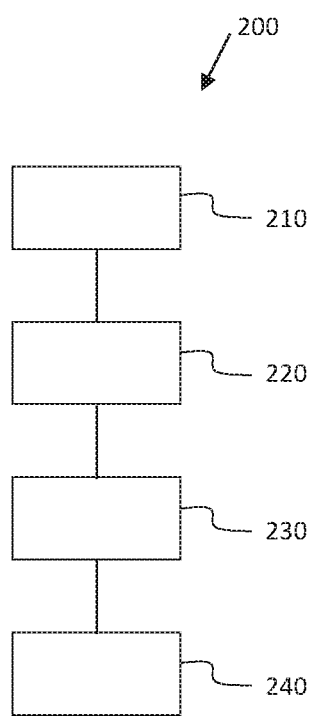
FIG. 3 is a schematic chart illustrating the basic steps involved in a method according to the present disclosure.

FIG. 3 is a schematic chart illustrating the basic steps involved in a method according to the present disclosure. In a first step of receiving 210, the P-CSCF node comprised by the IMS network, receives a Session Initiation Protocol, SIP, Register message for registering the UE in the IMS network.

In a further step of determining 220, the P-CSCF node determines that the SIP Register message comprises an indication that the UE is using a low access priority, wherein the low access priority indicates at least a reduced priority for the UE for accessing network resources;

In a step of establishing 230, the P-CSCF node establishes the registration of the UE with the determined low access priority indication.

The method may 200 may also comprise the additional step of using 240, wherein the IMS network uses the determined low access priority for the UE for any of Prioritization, Charging Data record's, CDRs, Counters and Network-to-Network Interface, NNI, selection.

Figure 4:
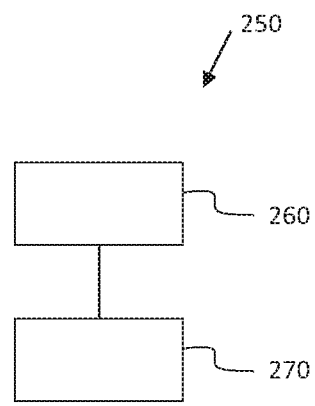
FIG. 4 is a schematic chart illustrating the basic steps involved in a method according to the present disclosure.

FIG. 4 is a schematic chart illustrating the basic steps involved in a method 250 according to the present disclosure. In a first step, the PCRF receives 260 an indication that UE is using low access priority. Such a reception 260 is triggered by a PDN connectivity request requesting to set up a PDN connection for the UE. In a further step, the PCRF node informs 270 the P-CSCF node that the UE is accessing services in the IMS network using a low access priority.

With this step of informing 270, the PCRF enables the registration of the UE in the IMS network with the low access priority indication. Once the P-CSCF receives the low access priority indication from the PCRF, the P-CSCF can proceed to register the UE with the low access priority in the IMS network. The step of informing may be initiated by the P-CSCF node, for example.

According to an embodiment, the P-CSCF sends a query to the PCRF to determine whether the UE is indeed using a low priority access. The PCRF, upon receiving such a query, determines whether or not the UE is registered in the PCRF with the low access priority. If the UE is registered with the low access priority, the PCRF then sends an acknowledgement message confirming that the UE is indeed authorized to use the low priority access and that the UE may be registered in the IMS network with the indicated low access priority.

Figure 5:
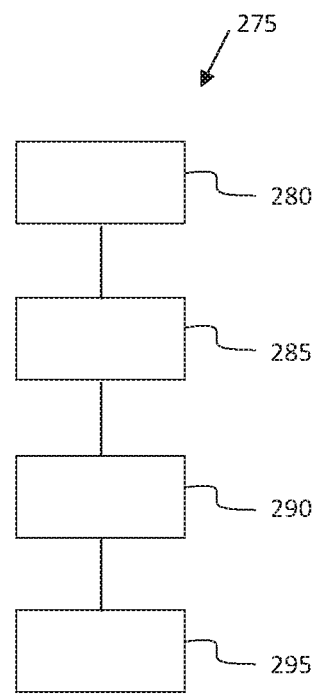
FIG. 5 is a schematic chart illustrating the basic steps involved in a method according to the present disclosure.

FIG. 5 is a schematic chart illustrating the basic steps involved in a method 275 according to the present disclosure. In a first step, a UE transmits 280 a PDN connectivity request towards an access node. This request is arranged for setting up a PDN connection that allows the UE to obtain access to an IMS network. The access node that receives such a request may be a P-GW, for example. The request may also comprise an indicator that the UE is accessing the IMS network using a low access priority.

Subsequent to the transmitting 280 a request, the UE receives 285 a confirmation that the PDN connection has been established. The UE receives 285 such a confirmation from the access node such as the P-GW, for example. Once a PDN connection has been established, the UE transmits 290 an SIP message for registering the UE with low access priority in the IMS network. Finally, the UE receives 295 a confirmation of its registration in the IMS network with the low access priority.

Figure 6:
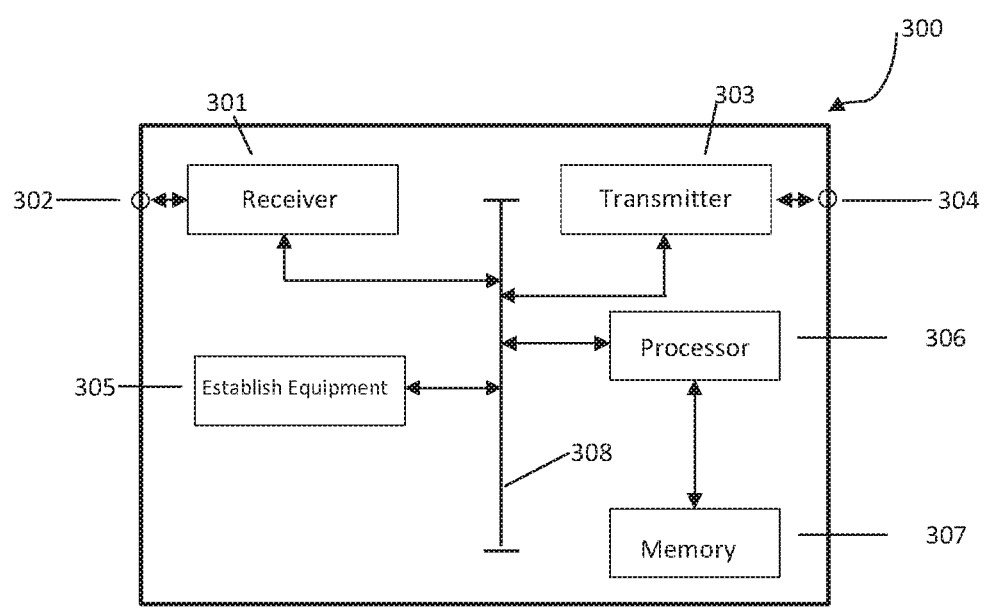
FIG. 6 is a schematic chart illustrating an example of a network element according to the present disclosure.

FIG. 6 is a schematic chart illustrating an example of a network element 300 according to the present disclosure. Such a network element 300 may be a P-CSCF node, for example. The node comprises of receiver 301, 302 in order to receive signalling messages from other nodes in the communication network. Such signalling messages are, for example, the SIP messages. The receiver 301, 302 is further arranged to receive an indication of low priority access from the other nodes such as a PCRF node.

The network element 300 further comprises a processor 306 that is arranged to determine whether the UE is authorized to use the low priority for accessing services in the IMS network. The processor 306 is further arranged for executing instructions stored in the memory 307 that cause the network element 300 to perform a method according to the present disclosure.

The network element 300 comprises of establish equipment 305 that is arranged for establishing the registration of the UE in the IMS network. Such an establishment is subsequent to the determination by the processor 306 that the UE is indeed authorized to use the low priority for accessing services in the IMS network. Furthermore, the network element 300 also comprises of transmitter means 303, 304 that are arranged for communicating with other nodes in the communication network. The internal equipments of the network element 300 communicate with one another using a bus 308.

Figure 7:
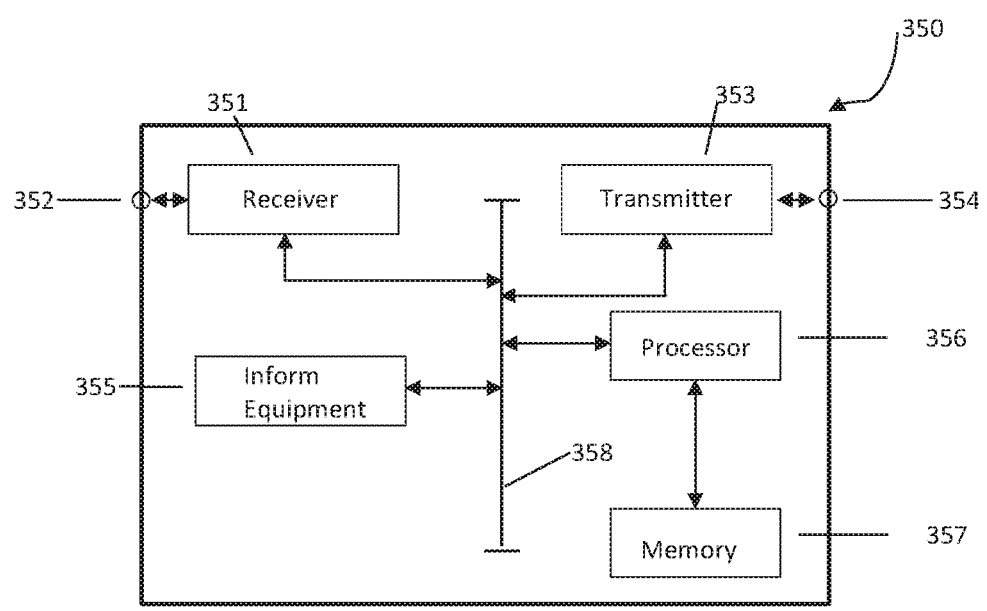
FIG. 7 is a schematic chart illustrating an example of a network element according to the present disclosure.

FIG. 7 is a schematic chart illustrating an example of a network element 350 according to the present disclosure. Such a network element 350 may be a PCRF node, for example. The node comprises of receiver 351, 352 in order to receive signalling messages from other nodes in the communication network. Such signalling messages are, for example, the SIP messages. The receiver 351, 352 is further arranged to receive an indication of low priority access from the other nodes such as a P-CSCF node.

The network element 350 further comprises a processor 356 that is arranged to determine whether the UE is authorized to use the low priority for accessing services in the IMS network. The processor 356 is further arranged for executing instructions stored in the memory 357 that cause the network element 350 to perform a method according to the present disclosure. The memory 357 may be arranged to store information relating to the UE. For example, the memory 357 stores an indication that the UE is authorized to use a low access priority.

The network element 350 comprises of inform equipment 355 that is arranged for informing the P-CSCF that the UE is using low access priority to access services within the IMS network. The network element 350 may do so by checking internally, for example in the memory 357, to see whether a low access priority is already associated with the UE. Once it is determined that the UE is actually using the reduced priority for accessing network resources, the inform equipment 355 provides such an indication to the transmitter such that the information is made available to the P-CSCF, thereby facilitating the registration of the UE with low access priority in the IMS network. Furthermore, the network element 300 also comprises of transmitter means 303, 304 that are arranged for communicating with other nodes in the communication network.

Figure 8:
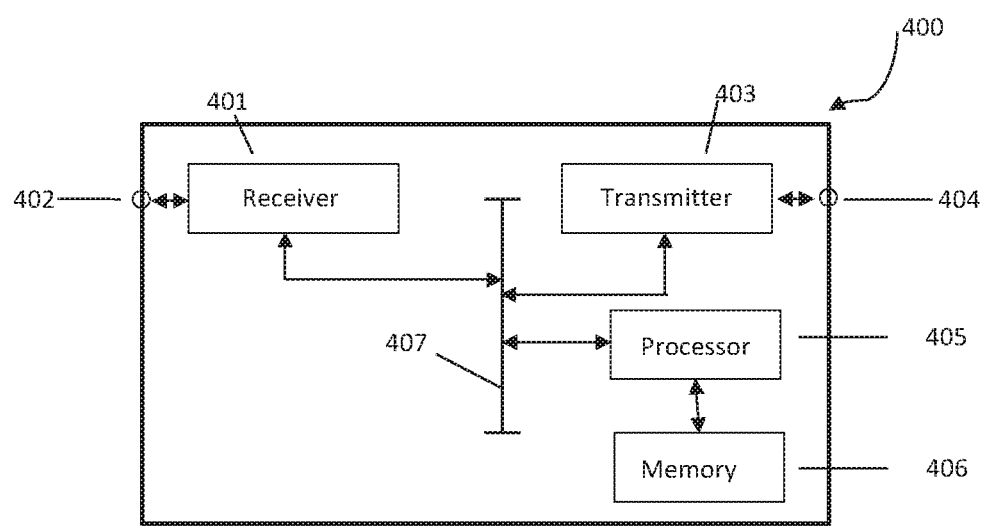
FIG. 8 is a schematic chart illustrating an example of a network element according to the present disclosure.

FIG. 8 is a schematic chart illustrating an example of a network element 400 according to the present disclosure. Such a network element 400 may be a UE, for example. The node comprises of receiver 401, 402 in order to receive signalling messages from other nodes in a communication network. The UE 400 is at least arranged to receive, via receiver means 401, 402, confirmation messages from an access node that confirm the setting up of a PDN connection and also confirm the registration of the UE in the IMS network.

The processor 405 is arranged for executing instructions stored in the memory 406 that cause the network element 400 to perform a method according to the present disclosure. Furthermore, the network element 400 also comprises of transmitter means 403, 404 that are arranged for communicating with other nodes in the communication network. Specifically, the transmitter means 403, 404, are at least arranged for transmitting a PDN connectivity request to an access node and also for transmitting an SIP register message, over an established PDN connection, for registering said UE 400 in an IMS network.

In some embodiments, to solve the problems as mentioned in section 4.2, when the PGW is informed about low access priority, it informs the PCRF via Gx. If P-CSCF has subscribed to be informed, then PCRF will notify the P-CSCF. This is using the 3GPP Rx reference point. P-CSCF may also request this information from the PCRF over Rx interface to include it into SIP messages. The UE may include the low access priority indication also in SIP REGISTER or in any other SIP message toward IMS.

The P-CSCF, if receiving this information from the UE, will check with PCRF whether low access priority is used by EPC and If confirmed, then keep low access priority in the SIP message If not confirmed, remove low access priority indication from the SIP message The IMS, if receiving the low access priority information, will use for one or more of the following Prioritization CDRs Counters NNI selection Based on local policy and taking subscriber information into account, the IMS will decide whether to forward the low access priority indication over the NNI or not Some embodiments according to the present disclosure enable that IMS is informed. If the IMS PDN is used for the UE configured for NAS signalling low priority can use this information for own purpose (prioritization, CDRs, counters), can use it for NNI selection and can provide a low priority indication over NNI.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method implemented by a Proxy-Call Serving Control Function (P-CSCF) node in an Internet Protocol (IP) based Multimedia Subsystem (IMS) network for registering a User Equipment (UE) operating in a telecommunication network with the IMS network, the method comprising:

receiving, a Session Initiation Protocol (SIP) Register message for registering the UE in the IMS network, the SIP Register message including an indication that the UE is using a low access priority for accessing network resources in the telecommunication network;

responsive to the SIP Register message, sending a request message to a Policy and Charging Rules Function (PCRF) node in the telecommunication network requesting verification that the UE is using the low access priority;

receiving a response message from the PCRF node indicating whether the UE is using the low access priority; and when the response message indicates that the UE is using the low access priority, forwarding the SIP Register message with the low access priority indication to a network node in the IMS network to register the UE in the IMS network.

2. The method of claim 1, further comprising, when the response message indicates that the UE is not using the low access priority:

removing the low access priority indication from the SIP Register message; and forwarding the SIP Register message without the low access priority indication to a network node in the IMS network to register the UE in the IMS network.

3. The method of claim 1, further comprising using, by the IMS network, the determined low access priority for the UE for any of: Prioritization, Charging Data Record's Counters, and Network-to-Network Interface selection.

4. The method of claim 1, wherein the forwarding comprises forwarding the SIP Register message to any of: an Interrogating Call State Control Function (I-CSCF) node or a Serving Call State Control Function (S-CSCF) node comprised by the IMS network.

5. A method for enabling registration of a User Equipment (UE) with low access priority in an Internet Protocol based Multimedia Subsystem (IMS) network, wherein the UE is configured to be connected to a telecommunication network, wherein the telecommunication network comprises a Policy and Charging Rules Function (PCRF) node, the method comprising:

receiving, by the PCRF node and from a Packet Gateway (PGW) node and triggered by a Public Data Network (PDN) connectivity request for requesting a PDN connection for the UE, an indication that the UE is using low access priority, wherein the low access priority indicates at least a reduced priority for the UE for accessing network resources;

informing, by the PCRF node, a Proxy-Call Serving Control Function (P-CSCF) node comprised in the IMS network that the UE is using the low access priority for enabling the P-CSCF node to register the UE in the IMS network using the low access priority.

6. The method for of claim 5, wherein the P-CSCF node has subscribed to the PCRF for receiving indications that the UE is using low access priority, and wherein the informing is actively triggered by the received indication that the UE is using low access priority.

7. The method of claim 5, wherein the informing comprises:

receiving, by the PCRF node and from the P-CSCF node, a request whether the UE is using the low access priority;

transmitting, by the PCRF node and to the P-CSCF node, an acknowledgement that the UE is using the low access priority.

8. A method for registering a User Equipment (UE) with low access priority in an Internet Protocol based Multimedia Subsystem (IMS) network, the method comprising:
  transmitting, by the UE and to an access node comprised in a telecommunication network, a Public Data Network (PDN) a connectivity request for requesting a PDN connection for obtaining access to the IMS network, wherein the PDN connectivity request comprises an indication that the UE is using low access priority, wherein the low access priority indicates at least a reduced priority for the UE for accessing network resources
  receiving, by the UE and from the access node, confirmation that the PDN connection is established;
  transmitting, by the UE and towards the IMS network and over the established PDN connection, a Session Initiation Protocol (SIP) Register message for registering the UE in the IMS network, wherein the SIP Register message comprises the indication that the UE is using low access priority;
  receiving, by the UE and from the access node, an SIP acknowledgement message indicating that the UE is registered in the IMS network using low access priority.

9. A Proxy-Call Serving Control Function (P-CSCF) node configured to support registration of a User Equipment (UE) with low access priority in an Internet Protocol based Multimedia Subsystem (IMS), network, P-CSCF node comprising:
  receive circuitry configured to receive a Session Initiation Protocol (SIP) Register message for registering the UE in the IMS network, the SIP Register message including an indication that the UE is using a low access priority for accessing network resources in the telecommunication network;
  processing circuitry configured to:
    send, responsive to the SIP Register message, a request message to a Policy and Charging Rules Function (PCRF) node in the telecommunications network requesting verification that the UE is using the low access priority; and
    receive a response message from the PCRF node indicating whether the UE is using the low access priority
  establish circuitry configured to, when the response message indicates that the UE is using the low access priority, forward the SIP Register message with the low access priority indication to a network node in the IMS network to register the UE in the IMS network.

10. The P-CSCF node of claim 9, wherein the establish circuitry is further configured to, when the response message indicates that the UE is not using the low access priority:
  remove the low access priority indication from the SIP Register message; and
  forward the SIP Register message without the low access priority indication to a network node in the IMS network to register the UE in the IMS network.

11. The P-CSCF node of claim 9, wherein the processing circuitry is configured to use the determined low access priority for the UE for transmitting to a subsequent node in the IMS for any of Prioritization, Charging Data Record's Counters, and Network-to-Network Interface selection.

12. The P-CSCF node of claim 9, wherein the P-CSCF node further comprises transmit circuitry configured to transmit the SIP Register message to a Interrogating Call State Control Function (I-CSCF) node comprised in the IMS network.

13. A Policy and Charging Rules Function (PCRF) node configured to operate in a telecommunication network and to enable registration of a User Equipment (UE) with low access priority in an Internet Protocol based Multimedia Subsystem (IMS) network, wherein the UE is configured to be connected to the telecommunication network, the PCRF node comprising:
  receive circuitry configured to receive, from a Packet Gateway (PGW) node and triggered by a Public Data Network (PDN) a connectivity request for requesting a PDN connection for the UE, an indication that the UE is using low access priority, wherein the low access priority indicates at least a reduced priority for the UE for accessing network resources;
  processing circuitry configured to inform a Proxy-Call Serving Control Function (P-CSCF) node in the IMS network that the UE is using the low access priority for enabling the P-CSCF node to register the UE in the IMS network using the low access priority.

14. The PCRF node of claim 13, wherein the processing circuitry is configured to be actively triggered by the received indication that the UE is using low access priority.

15. The PCRF node of claim 13, wherein the processing circuitry is configured to:
  receive, from the P-CSCF node, a request whether the UE is using the low access priority;
  transmit, to the P-CSCF node, an acknowledgement that the UE is using the low access priority.

16. A User Equipment (UE) configured to request registration in an Internet Protocol based Multimedia Subsystem (IMS) network with low access priority, the UE comprising:
  processing circuitry;
  memory containing instructions executable by the processing circuitry whereby the UE is operative to:
    transmit, to an access node in a telecommunication network, a Public Data Network (PDN) connectivity request for requesting a PDN connection for obtaining access to the IMS network, wherein the PDN connectivity request comprises an indication that the UE is using low access priority, wherein the low access priority indicates at least a reduced priority for the UE for accessing network resources;
    receive, from the access node, confirmation that the PDN connection is established;
    transmit, over the established PDN connection and towards the IMS network, a Session Initiation Protocol (SIP) Register message for registering the UE in the IMS network, wherein the SIP Register message comprises the indication that the UE is using low access priority;
    receive, from the access node, an SIP acknowledgement message indicating that the UE is registered in the IMS network using low access priority.

* * * * *